(12) United States Patent
Tsao et al.

(10) Patent No.: US 9,479,731 B2
(45) Date of Patent: Oct. 25, 2016

(54) METHODS AND SYSTEMS FOR STREAMING MEDIA TRANSMISSION

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Yu-Hsiang Tsao, New Taipei (TW); Ming-Chuan Kao, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/931,826

(22) Filed: Nov. 3, 2015

(65) Prior Publication Data
US 2016/0127687 A1     May 5, 2016

(30) Foreign Application Priority Data
Nov. 5, 2014   (CN) .......................... 2014 1 0617039

(51) Int. Cl.
*H04N 7/15*     (2006.01)

(52) U.S. Cl.
CPC ...................... *H04N 7/15* (2013.01)

(58) Field of Classification Search
USPC ....................................... 348/14.08
See application file for complete search history.

(56) References Cited

U.S. PATENT DOCUMENTS

| | | | | |
|---|---|---|---|---|
| 2010/0061537 A1* | 3/2010 | Nakamura | .......... | H04L 12/1831 379/202.01 |
| 2011/0150199 A1* | 6/2011 | Gisby | ................... | H04M 3/563 379/202.01 |
| 2014/0132701 A1* | 5/2014 | Wang | .................... | G06F 17/289 348/14.08 |
| 2015/0381936 A1* | 12/2015 | Goyal | ...................... | H04N 7/15 348/14.06 |
| 2016/0065742 A1* | 3/2016 | Nasir | .................... | H04M 3/563 455/416 |

\* cited by examiner

*Primary Examiner* — Creighton Smith
(74) *Attorney, Agent, or Firm* — Zhigang Ma

(57) ABSTRACT

The present disclosure provides a streaming media transmission method applied in the video conference. A chairman client, a participant client, an electronic device and all are connected with a server. The chairman client invites the participant clients to join the video conference room built in the electronic device. The chairman client and the participant client request the image according to the video conference room. Every one of the participant client selects the image by the participant themselves, and the image quality of the video conference is guaranteed.

9 Claims, 3 Drawing Sheets

METHODS AND SYSTEMS FOR STREAMING MEDIA TRANSMISSION

FIELD

The subject matter herein generally relates to a video conference technology, in particular to methods and systems for streaming media transmission.

BACKGROUND

The Multi-point Control Unit (MCU) is generally used as a multi-point video architecture of a video conference. The video conferences are generally applied in an enterprise when a meeting with other offices is needed. However, the MCU video conference displays all the menus of all the participants on one screen. So the screen has many partitions, each partition is small and difficult to distinguish.

BRIEF DESCRIPTION OF THE DRAWINGS

Implementations of the present technology will now be described, by way of example only, with reference to the attached figures, wherein.

DETAILED DESCRIPTION

The disclosure including the accompanying drawings, is illustrated by way of examples and not by way of limitation. It should be noted that references to "an" or "one" embodiment in this disclosure are not necessarily to the same embodiment, and such references mean "at least one".

In general, the word "module", as used herein, refers to logic embodied in hardware or firmware, or to a collection of software instructions, written in a programming language. One or more software instructions in the modules may be embedded in hardware, such as in an erasable programmable read only memory (EPROM). The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
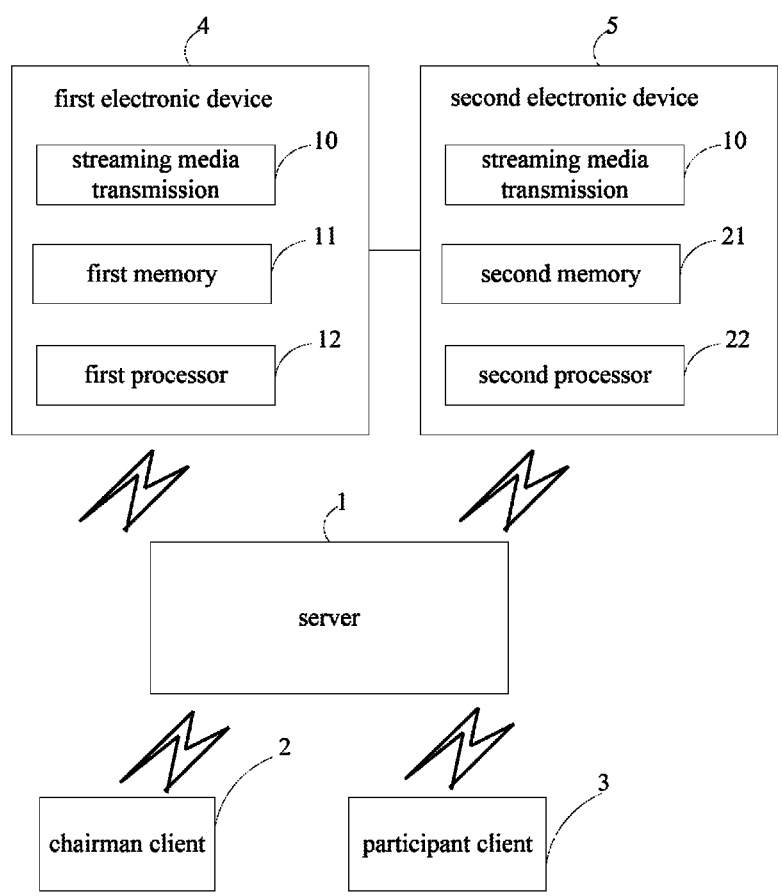
FIG. 1 illustrates an environment of a streaming media transmission system according to an embodiment of the disclosure.

FIG. 1 illustrates an environment of a streaming media transmission system according to an embodiment of the disclosure. In the embodiment, a server 1 communicates with a chairman client 2, at least one participant client 3, electronic device 4, and electronic device 5 via the wireless network or the internet network. A streaming media transmission system 10 runs on the electronic device 4 and the electronic device 5, the electronic device 4 and the electronic device 5 can be a computer, a cell phone, a handset, or a Personal Digital Assistant (PDA) and so on.

The chairman client 2 and the participant client 3 can be a cell phone with a camera, a PDA, or other electronic devices. The streaming media transmission system 10 includes one or more modules stored in a first memory 11 and a second memory 21, and the modules are configured by a first processor 12 and a second processor 22 executed to complete the function as follows: The chairman client 2 communicates with several participant clients 3 in a video conference, each of the participant clients 3 displays the conference menu selected by the participants themselves, and the image quality of the video conference is guaranteed.

Figure 2:
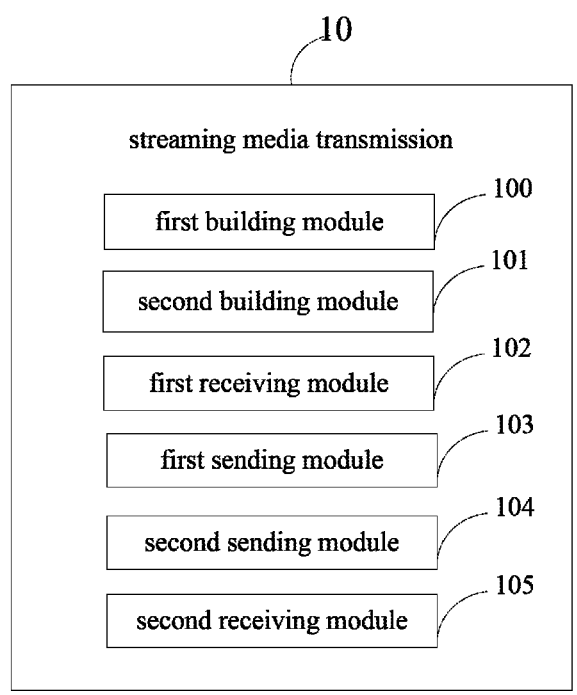
FIG. 2 is a block diagram of a streaming media transmission system according to an embodiment of the disclosure.

FIG. 2 illustrates a block diagram of a streaming media transmission system according to an embodiment of the disclosure. In the illustrated embodiment, the streaming media transmission system 10 includes a first building module 100, a second building module 101, a first receiving module 102, a first sending module 103, a second sending module 104 and a second receiving module 105. The first building module 100, the first receiving module 102 and the first sending module 103 run on the first electronic device 4. The second building module 101, the second sending module 104 and the second receiving module 105 run on the second electronic device 5. The functions of all the modules are further illustrated with reference to FIG. 3.

Figure 3:
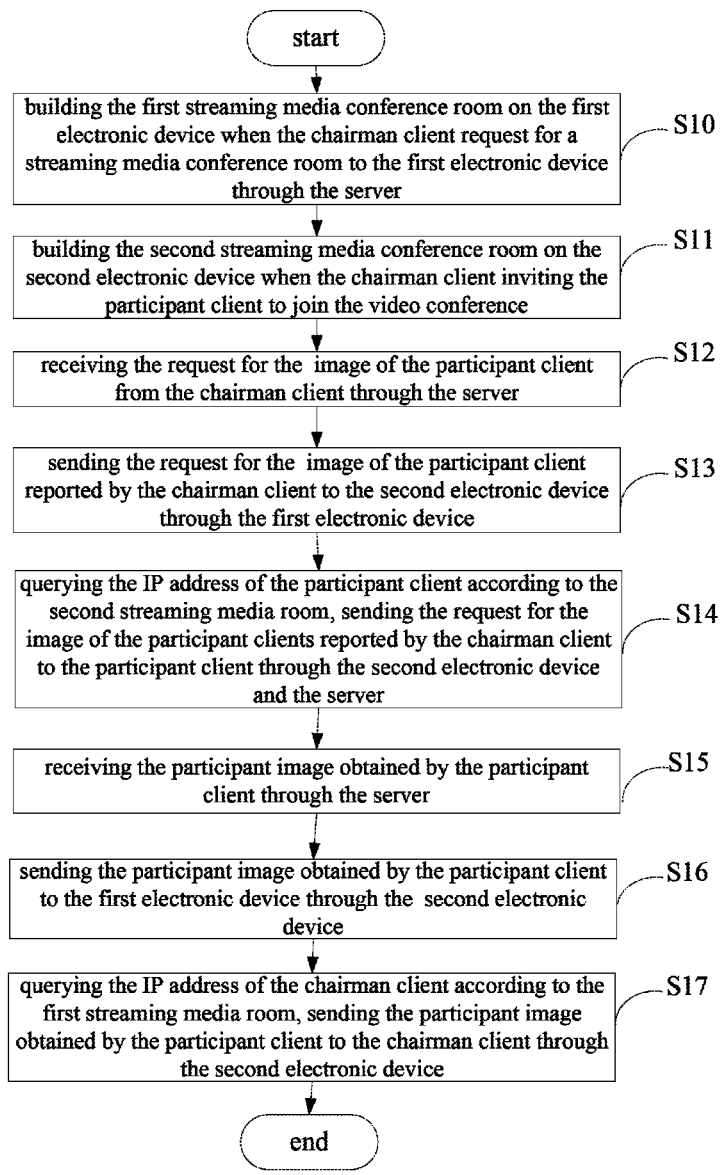
FIG. 3 is a flowchart of a method for streaming media transmission according to an embodiment of the disclosure.

FIG. 3 illustrates a flowchart of a method for streaming media transmission according to an embodiment of the disclosure. Note that the steps in FIG. 3 may be performed concurrently or in different order, and some steps can be omitted.

At block 10, the first building module 100 builds the first streaming media conference room on the first electronic device 4 when a streaming media conference is requested by the chairman client 2 with the first electronic device 4 through the server 1.

The first streaming media conference room on the first electronic device 4 is built by the first building module 100 with the following steps. The first building module 100 receives a request for a streaming media conference room from the chairman client 2 through the server 1. The first building module 100 builds the first streaming media conference room on the first electronic device 4 and sets the information of the first streaming media conference room. In the illustrated embodiment, the information of the first streaming media conference room includes the name of the first streaming media conference room, the name of chairman on the chairman client 2 and the Internet Protocol (IP) of the chairman client 2, etc. The first building module 100 sends the information of the first streaming media conference room through the server 1 to the chairman client 2.

At block 11, the second building module 101 builds the second streaming media conference room on the second electronic device 5 when the participant client 3 is invited to join the video conference by the chairman client 2.

In the illustrated embodiment, the second building module 101 builds the second streaming media conference room on the second electronic device 5 comprising the following steps.

(a). The second building module 101 receives the request for inviting the participant client 3 to join the video conference from the chairman client 2 through the server 1, and sets the information of the participant client 3 in the first streaming media conference room of the first electronic device 4.

(b). The second building module 101 sends the information of the participant client 3 to the server 1 to inform the participant client 3.

(c). When the sever 1 receives the agreement of the participant client 3 joining the first streaming media conference room, the second building module 101 receives the information of the agreement of the participant client 3 joining the first streaming media conference room from the sever 1.

(d). The second building module 101 builds the second streaming media conference room on the second electronic device 5 and sets the information of the second streaming media conference room.

(e). The second building module 101 sends the information of the second streaming media conference room setting on the second electronic device 5 through the server 1 to the participant client 3.

In the illustrated embodiment, the information of the second streaming media conference room includes the name of the second streaming media conference room, the name of the participant on the participant client 3 and the Internet Protocol (IP) of the participant client 3, etc. The second streaming media conference room provides the video conference the same as the first streaming media conference room. The building of the first streaming media conference room and the second streaming media conference room on the first electronic device 4 and the second electronic device 5 is to reduce the video conference broadband transmission and faster transmission of the video stream to enable smoother video conferencing.

At block 12, the first receiving module 102 receives the request through the server 1 to display an image of the participant client 3 from the chairman client 2.

At block 13, the first sending module 103 sends the request for the image of the participant client 3 reported by the chairman client 2 through the first electronic device 4 to the second electronic device 5.

At block 14, the second sending module 104 queries the IP address of the participant client 3 according to the second streaming media room, sends the request for the image of the participant client 3 reported by the chairman client 2 through the second electronic device 5 and the server 1 to the participant client 3.

At block 15, when the participant client 3 obtains the participant image through the camera unit and sends the participant image to the server 1, the second receiving module 105 receives the participant image from the server 1.

At block 16, the second sending module 104 sends the participant image obtained from the participant client 3 through the second electronic device 5 to the first electronic device 4.

At block 17, the first sending module 103 queries the IP address of the chairman client 2 according to the first built streaming media room, and sends the participant image obtained from the participant clients 3 through the second electronic device 5 to the chairman client 2.

When the participant client 3 sends a request to the chairman client 2 for the image, the second electronic device 5 receives the request for the image from the sever 1, sends the request through the second electronic device 5 to the first electronic device 4, then the first electronic device 4 sends the request to the chairman client 2. The chairman client 2 sends the image requested by the participant client 3 to the first electronic device 4, then the first electronic device 4 sends this displayed image to the second electronic device 5, and finally the second electronic device 5 sends the image to the participant client 3. The process proceeds the same as the process at the blocks 12-17.

In this embodiment, the streaming media transmission system is built with only one chairman client and one participant client, the number of the chairman clients and the participant clients is not limited in the other embodiments because more than one chairmen and participants can join in a video conference.

In the other embodiments, the first electronic device 4 and the second electronic device 5 can be the same electronic device. For example, one electronic device can substitute for the first electronic device 4 and the second electronic device 5 to cut cost when the chairman client and the participant clients are set in the same place.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A streaming media transmission system, running on a first electronic device and a second electronic device, wherein the first electronic device and the second electronic device are coupled to a server, and the server is coupled to a chairman client and a participant client, the streaming media transmission system comprising:
   at least one processor;
   a non-transitory storage system coupled to the at least one processor and configured to store one or more programs that are executed by the at least one processor, the one or more programs comprising instructions for:
   running on the first electronic device, receiving a request for building a first streaming media conference room from the chairman client through the server, and building the first streaming media conference room on the first electronic device;
   running on the second electronic device, receiving a request for inviting a participant to join the first streaming media conference room from the chairman client through the server, and building a second streaming media conference room on the second electronic device;
   running on the first electronic device, receiving a request for a participant image from the chairman client through the server;
   running on the first electronic device, sending the request for the participant image to the second electronic device from the first electronic device;
   running on the second electronic device, querying a IP address of the participant client according to the second streaming media room, sending the request for the participant image through the server to the participant client according to the IP address of the participant client; and
   running on the second electronic device, receiving a participant image obtained from the participant client through the server;
   wherein the second electronic device sends the participant image obtained by the participant client to the first electronic device, and the first electronic device queries a IP address of the chairman client according to the first streaming media conference room, and sends the participant image received from the second electronic device to the chairman client according to the IP address of the chairman client.

2. The system as claimed in claim 1, wherein the first electronic device builds the first streaming media conference room by:
   building the first streaming media conference room on the first electronic device, and setting information of the first streaming media conference room; and
   sending the information of the first streaming media conference room through the server to the chairman client.

3. The system as claimed in claim 1, wherein the second electronic device builds the second streaming media conference room by:
  setting information of the participant client;
  sending the information of the participant client to the server, to inform the participant client to join the video conference by the server;
  receiving a agreement of the participant client joining the first streaming media conference room form the participant client through the server;
  building the second streaming media conference room on the second electronic device, and setting information of the second streaming media conference room.

4. The system as claimed in claim 1, wherein a video conference provided by the second streaming media conference room is the same as that provided by the first streaming media conference room.

5. A streaming media transmission method, applying in a first electronic device and a second electronic device, the first electronic device and the second electronic device are coupled to a server, and the server is coupled to a chairman client and a participant client, comprising:
  receiving a request for building a first streaming media conference room from the chairman client through the server, and building a first streaming media conference room on the first electronic device;
  receiving a request for inviting a participant to join the first video conference room from the chairman client through the server, and building a second streaming media conference room on the second electronic device;
  receiving a request for a participant image from the chairman client through the server;
  sending the request for the participant image to the second electronic device from the first electronic device;
  querying a IP address of the participant client according to the second streaming media room, sending the request for the participant image through the server to the participant client according to the IP address of the participant client;
  receiving the participant image obtained from the participant client through the server;
  sending the participant image obtained from the participant client from the second electronic device to the first electronic device; and
  querying a IP address of the chairman client according to the first streaming media conference room, and sending the participant image received from the second electronic device to the chairman client according to the IP address of the chairman client.

6. The method as claimed in claim 5, wherein building the first streaming media conference room, comprises:
  building the first streaming media conference room on the first electronic device, and setting information of the first streaming media conference room; and
  sending the information of the first streaming media conference room through the server to the chairman client.

7. The method as claimed in claim 5, wherein building the second streaming media conference room, comprises:
  setting information of the participant client;
  sending the information of the participant client to the server, to inform the participant client to join the video conference by the server;
  receiving a agreement of the participant client joining the second streaming media conference room from the participant client through the server;
  building the second streaming media conference room on the second electronic device, and setting information of the second streaming media conference room.

8. The method as claimed in claim 5, wherein a video conference provided by the second streaming media conference room is the same as that provided by the first streaming media conference room.

9. A streaming media transmission system, running on an electronic device, the electronic device is coupled to a server, and the server is coupled to a chairman client and a participant client, the streaming media transmission system comprising:
  at least one processor;
  a non-transitory storage system coupled to the at least one processor and configured to store one or more programs that are executed by the at least one processor, the one or more programs comprising instructions for:
  receiving a request for building a first streaming media conference room from the chairman client through the server, building the first streaming media conference room on the electronic device, receiving a request for inviting a participant to join the first streaming media conference room from the chairman client through the server, and building a second streaming media conference room on the electronic device;
  receiving a request for a participant image from the chairman client through the server;
  querying a IP address of the participant client according to the second streaming media room, sending the request for the participant image to the participant client through the server according to the IP address of the participant client;
  wherein the electronic device receives the participant image from the participant client through the server, and queries a IP address of the chairman client according to the first streaming media room, and sends the participant image obtained from the participant client to the chairman client.

* * * * *